United States Patent
Yang et al.

(10) Patent No.: US 8,873,435 B2
(45) Date of Patent: Oct. 28, 2014

(54) SHORT RANDOM ACCESS CHANNEL (RACH) DISABLING IN TDD-LTE

(75) Inventors: Ming Yang, San Diego, CA (US); Tom Chin, San Diego, CA (US); Qingxin Chen, Del Mar, CA (US); Guangming Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 332 days.

(21) Appl. No.: 13/364,652

(22) Filed: Feb. 2, 2012

(65) Prior Publication Data

US 2013/0201885 A1    Aug. 8, 2013

(51) Int. Cl.
*H04J 3/00*    (2006.01)

(52) U.S. Cl.
USPC ............ 370/280; 370/276; 370/389; 370/392

(58) Field of Classification Search
None
See application file for complete search history.

(56) References Cited

U.S. PATENT DOCUMENTS

| | | | |
|---|---|---|---|
| 2009/0274076 A1* | 11/2009 | Muharemovic et al. ...... | 370/280 |
| 2009/0323664 A1* | 12/2009 | Li et al. ........................ | 370/344 |
| 2011/0098015 A1* | 4/2011 | Goodwin et al. ............. | 455/334 |
| 2011/0292846 A1* | 12/2011 | Hu et al. ....................... | 370/280 |
| 2012/0120854 A1* | 5/2012 | Zhang et al. .................. | 370/280 |
| 2012/0202487 A1* | 8/2012 | Kazmi et al. ............... | 455/432.1 |

FOREIGN PATENT DOCUMENTS

| | | |
|---|---|---|
| CN | 101212797 | 8/2010 |
| CN | 102014394 | 4/2011 |
| EP | 2273836 A1 | 1/2011 |
| WO | WO2009083927 | 7/2009 |
| WO | WO2011015152 | 2/2011 |

OTHER PUBLICATIONS

Catt, et al., "On collision between SRS and PRACH in UpPTS", Aug. 12, 2008, 3GPP Draft; R1-082963, 3rd Generation Partnership Project (3GPP), Mobile Competence Centre; 650, Route Des Lucioles; F-06921 Sophia-Antipolis Cedex; France, XP050316428, [retrieved on Aug. 12, 2008].
International Search Report and Written Opinion—PCT/US2013/024486—ISA/EPO—May 7, 2013.

(Continued)

*Primary Examiner* — Hassan Phillips
*Assistant Examiner* — Gautam Sharma
(74) *Attorney, Agent, or Firm* — Kristine U. Ekwueme (57) ABSTRACT

In TDD-LTE wireless systems, an additional fourth preamble for the random access channel, called short RACH, may be used. If short RACH signaling is to be used, the random access preamble is transmitted in the uplink pilot time slot (UpPTS) field in the special subframe. The location of the uplink pilot time slot (UpPTS) is next to a downlink subframe. Therefore, interference from neighbor base stations may interfere with the short RACH preamble within the uplink pilot time slot. The interference to the short RACH will prevent the eNodeB from detecting the short RACH preamble and thus prevent the UE from accessing the network. An interference level on an Uplink Pilot Time Slot (UpPTS) may be measured and when the interference level exceeds a threshold value a User Equipment (UE) is instructed to disable short Random Access Channel (RACH) signaling. The UE may then be instructed to enable normal RACH. When the interference level falls below the threshold value the UE is instructed to resume short RACH signaling.

28 Claims, 11 Drawing Sheets

(56) References Cited

OTHER PUBLICATIONS

Nokia Corporation et al., "Usage of UpPTS for sounding and short RACH for LTE TDD", Jan. 9, 2008, 3GPP Draft; R1-080321, 3rd Generation Partnership Project (3GPP), Mobile Competence Centre; 650, Route Des Lucioles; F-06921 Sophia-Antipolis Cedex; France, XP050108842, [retrieved on Jan. 9, 2008].

ZTE: "Some Issues about Short RACH for LTE TDD", Jan. 8, 2008, 3GPP Draft; R1-080216 Some Issues About Short RACH for LTE TDD, 3rd Generation Partnership Project (3GPP), Mobile Competence Centre; 650, Route Des Lucioles; F-06921 Sophia-Antipolis Cedex; France, XP050108742, [retrieved on Jan. 8, 2008].

3G Americas; 3GPP LTE for TDD Spectrum in the Americas; Nov. 2009; pp. 1-22.

* cited by examiner

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

FIG. 4

| Configuration | DwPTS | GP | UpPTS |
|---|---|---|---|
| 0 | 3 | 10 | 1 |
| 1 | 9 | 4 | |
| 2 | 10 | 3 | |
| 3 | 11 | 2 | |
| 4 | 12 | 1 | |
| 5 | 3 | 9 | 2 |
| 6 | 9 | 3 | |
| 7 | 10 | 2 | |
| 8 | 11 | 1 | |

SHORT RANDOM ACCESS CHANNEL (RACH) DISABLING IN TDD-LTE

BACKGROUND

1. Field

Aspects of the present disclosure relate generally to wireless communication systems, and more particularly to transmission of Random Access Channel (RACH) signaling.

2. Background

Wireless communication networks are widely deployed to provide various communication services such as voice, video, packet data, messaging, broadcast, etc. These wireless networks may be multiple-access networks capable of supporting multiple users by sharing the available network resources. A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

According to one aspect of the present disclosure, a method of disabling short RACH signaling is described. The method includes instructing a User Equipment (UE) to disable short Random Access Channel (RACH) signaling.

In another aspect, an apparatus for disabling short RACH signaling is described. The apparatus includes means for determining whether short Random Access Channel (RACH) signaling should be disabled by a User Equipment (UE). The apparatus further includes means for instructing the UE to disable short RACH signaling.

In a further aspect, a computer program product for disabling short RACH signaling is described. The computer program product includes a non-transitory computer-readable medium having non-transitory program code recorded thereon. The computer program product has program code to determine whether short Random Access Channel (RACH) signaling should be disabled by a User Equipment (UE). The computer program product further includes program code to instruct the UE to disable short RACH signaling.

According to another aspect, an apparatus for disabling short RACH signaling is described. The apparatus includes at least one processor; and a memory coupled to the processor. The processor(s) is configured to determine whether short Random Access Channel (RACH) signaling should be disabled by a User Equipment (UE). The processor(s) is further configured to instruct the UE to disable short RACH signaling.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA) and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
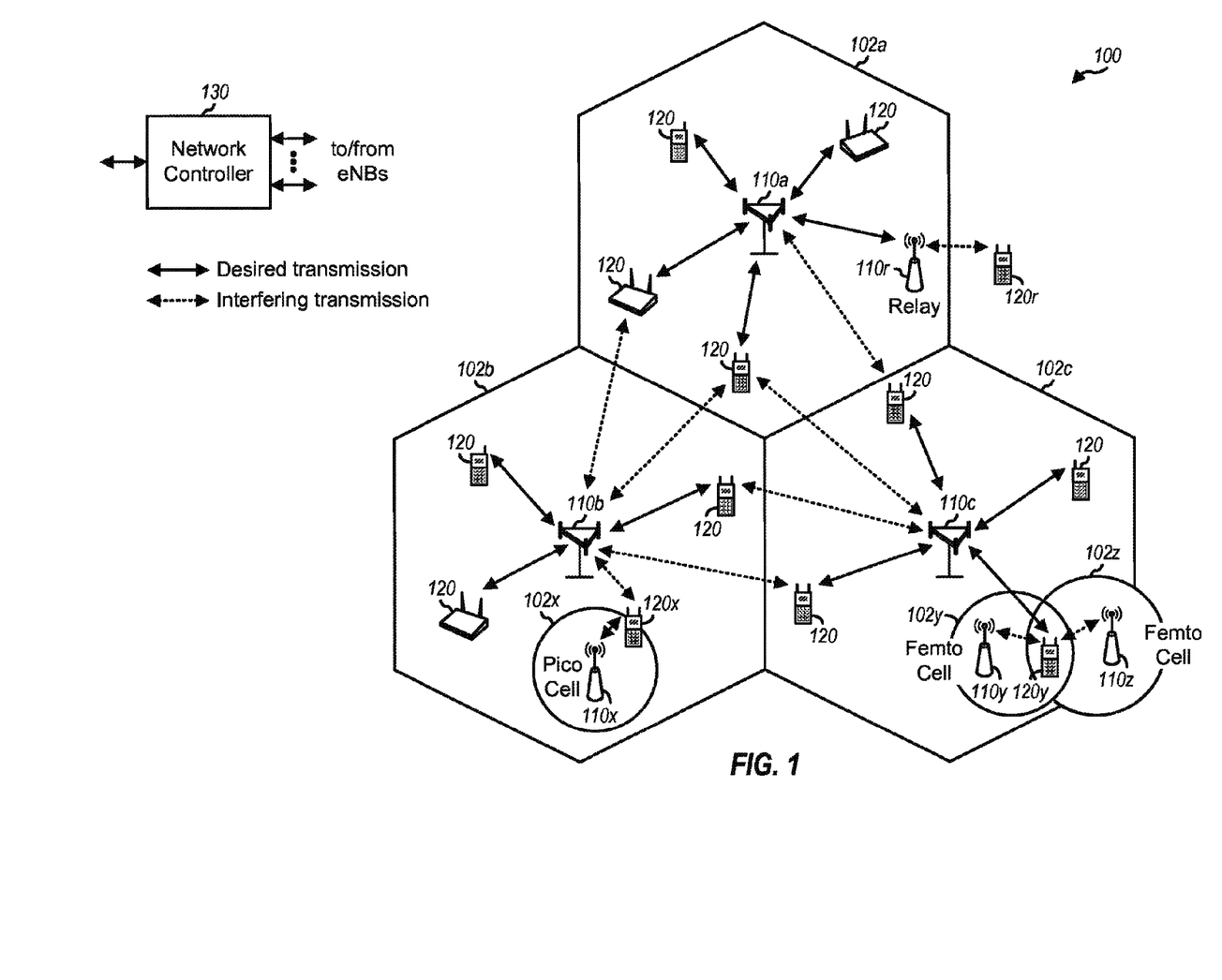
FIG. 1 is a block diagram conceptually illustrating an example of a telecommunications system.

FIG. 1 shows a wireless communication network 100, which may be an LTE-A network, in which short RACH disabling may be performed, according to one aspect of the present disclosure. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110$a$, 110$b$ and 110$c$ are macro eNodeBs for the macro cells 102$a$, 102$b$ and 102$c$, respectively. The eNodeB 110$x$ is a pico eNodeB for a pico cell 102$x$. And, the eNodeBs 110$y$ and 110$z$ are femto eNodeBs for the femto cells 102$y$ and 102$z$, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110$r$ may communicate with the eNodeB 110$a$ and a UE 120$r$ in order to facilitate communication between the eNodeB 110$a$ and the UE 120$r$. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous operations. For synchronous operation, the eNodeBs may have similar frame timing, and transmissions from different eNodeBs may be approximately aligned in time.

In one aspect, the wireless network 100 may support the Time Division Duplex (TDD) mode of operation. The techniques described herein may be used for TDD modes of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 (e.g., UE 120$x$, UE 120$y$, etc.) are dispersed throughout the wireless network 100, and each UE may be stationary or mobile. A UE may also be referred to as a terminal, a user terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a netbook, a smart book, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

A UE may be within the coverage of multiple eNodeBs. One of these eNodeBs may be selected to serve the UE. The serving eNodeB may be selected based on various criteria such as received power, path loss, signal-to-noise ratio (SNR), etc.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
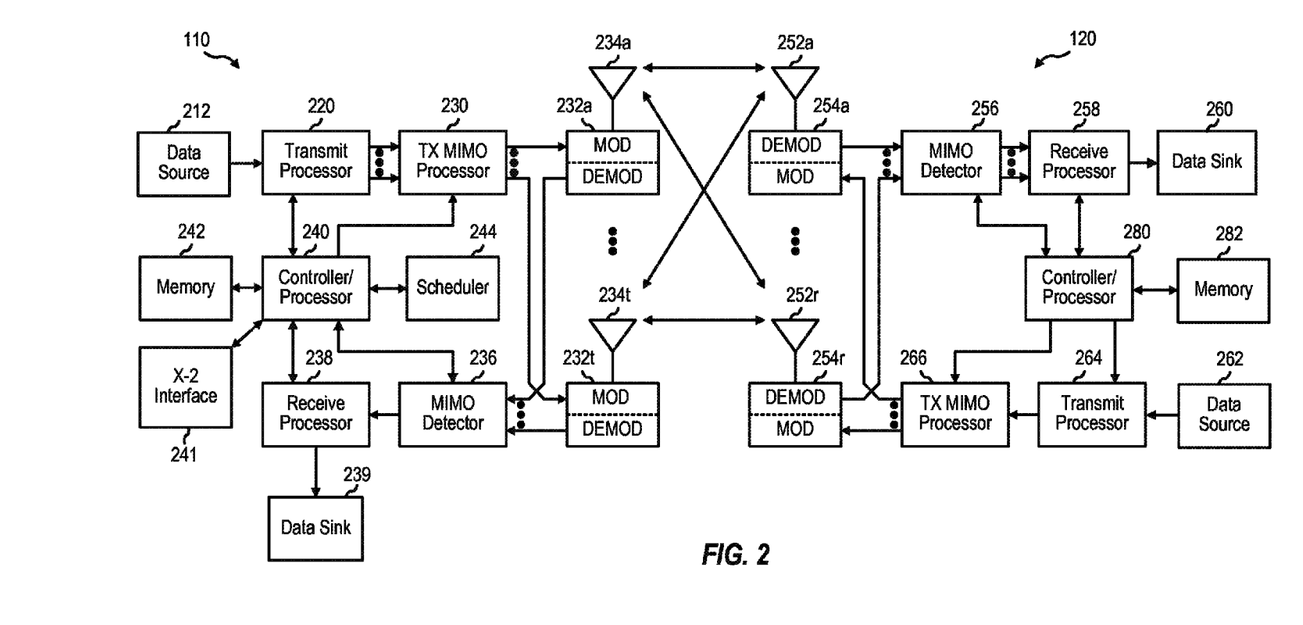
FIG. 2 is a block diagram conceptually illustrating a design of a base station/eNodeB and a UE configured according to an aspect of the present disclosure.

FIG. 2 shows a block diagram of a design of a base station/eNodeB 110 and a UE 120, which may be base stations/eNodeBs and one of the UEs (in FIG. 1) communicating with short RACH signaling. For example, the base station 110 may be the macro eNodeB 110c in FIG. 1, and the UE 120 may be the UE 120y. The base station 110 may also be a base station of some other type. The base station 110 may be equipped with antennas 234a through 234t, and the UE 120 may be equipped with antennas 252a through 252r.

At the base station 110, a transmit processor 220 may receive data from a data source 212 and control information from a controller/processor 240. The processor 220 may process (e.g., encode and symbol map) the data and control information to obtain data symbols and control symbols, respectively. The processor 220 may also generate reference symbols, e.g., for the cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data from a data source 262 and control information from the controller/processor 280. The processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 110. At the base station 110, the uplink signals from the UE 120 may be received by the antennas 234, processed by the demodulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240. The base station 110 can send messages to other base stations, for example, over an X2 interface 241.

The controllers/processors 240 and 280 may direct the operation at the base station 110 and the UE 120, respectively. The processor 240 and/or other processors and modules at the base station 110 may perform or direct the execution of various processes for the techniques described herein. The processor 280 and/or other processors and modules at the UE 120 may also perform or direct the execution of the functional blocks illustrated in use in FIGS. 7-9, and/or other processes for the techniques described herein. The memories 242 and 282 may store data and program codes for the base station 110 and the UE 120, respectively. A scheduler 244 may schedule UEs for data transmission on the downlink and/or uplink.

Figure 3:
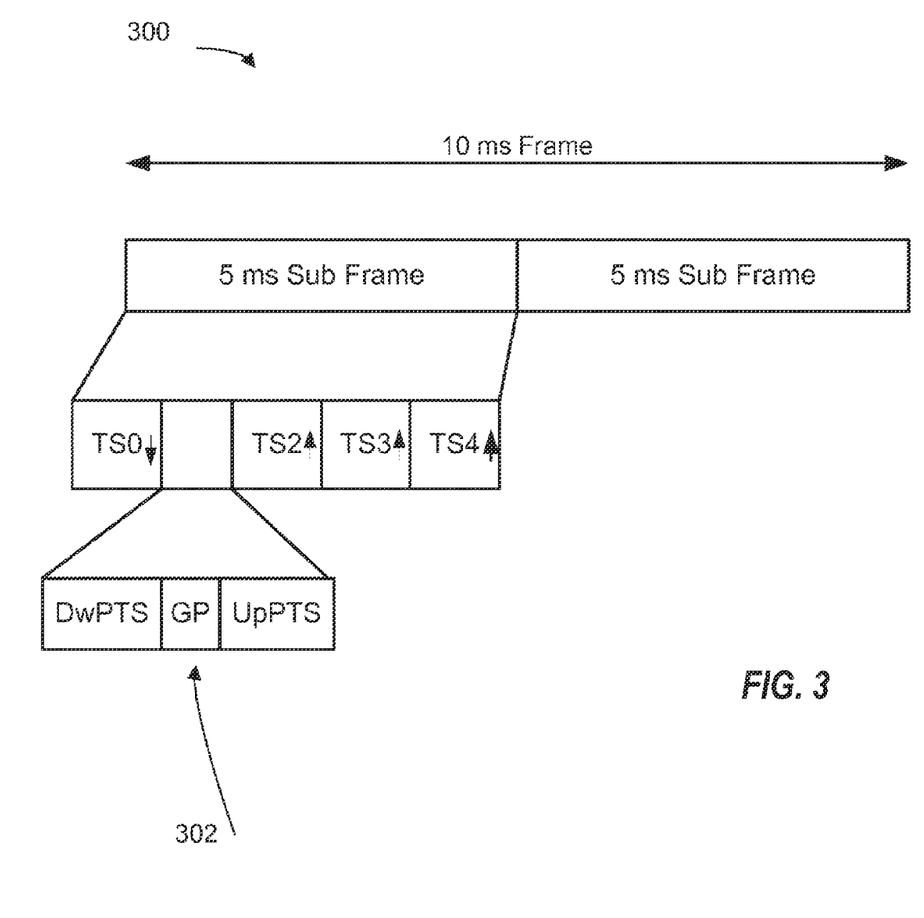
FIG. 3 is a diagram conceptually illustrating an example of a frame structure in a telecommunications system.

FIG. 3 shows an exemplary TDD frame structure in LTE. The transmission timeline may be partitioned into units of radio frames 300. Each radio frame may have a predetermined duration (e.g., 10 milliseconds (ms)) and may be partitioned into two half frames. Each half frame has five subframes. Each radio frame has 307200 Ts, where Ts is the basic time unit of TDD-LTE. Each subframe may be any of a downlink subframe (D) (shown with a downwardly pointing arrows), uplink subframe (U) (shown with an upwardly pointing arrows), or special subframe (S) 302. The special subframe may have three fields: DwPTS (Downlink Pilot Time Slot), Gap (GP), and UpPTS (Uplink Pilot Time Slot). Each subframe includes a number of OFDM symbol periods.

Figure 4:
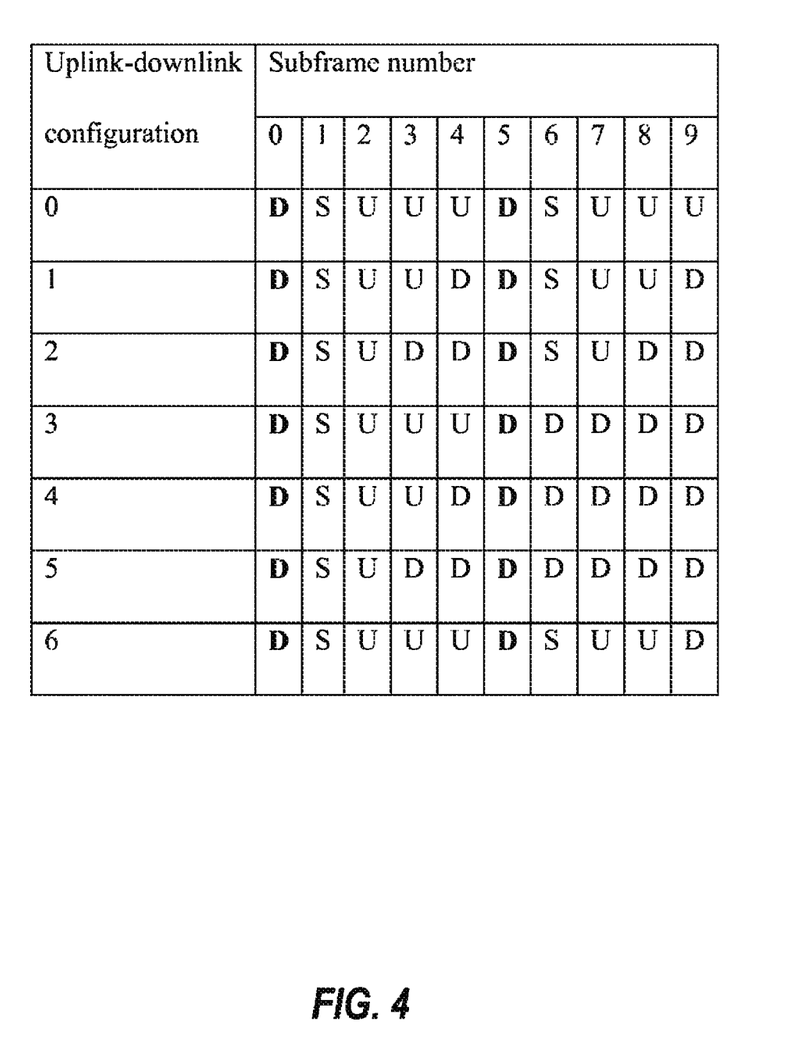
FIG. 4 is a diagram conceptually illustrating example subframe configurations.

Which subframes are uplink, downlink or special is determined based on a subframe configuration. FIG. 4 is a table illustrating exemplary subframe configurations. As shown in the figure, in the seven different configurations the downlink (D), uplink (U), and special (S) subframes can be ordered differently within a radio frame. In each of the illustrated configurations, subframe 0 is always a downlink (D) subframe, subframe 1 is always a special (S) subframe, and subframe 2 is always an uplink (U) subframe.

Figure 5:
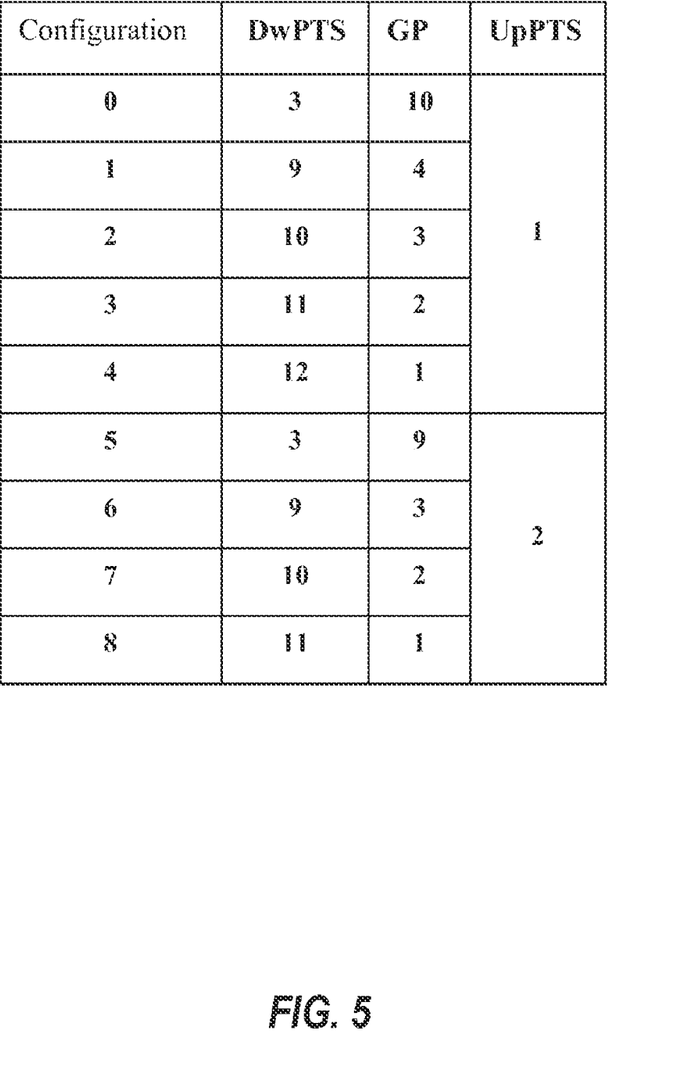
FIG. 5 is a table showing exemplary special subframe slot configurations.

TDD-LTE may support configurable special subframe fields. FIG. 5 is a table illustrating exemplary special subframe field configurations with the number of OFDM symbols allocated to each field. Each special subframe may be fourteen OFDM symbols long (for normal cyclic prefix). Therefore, the number of OFDM symbols allocated to each field for each configurations adds up to fourteen. For example, in configuration 0, the DwPTS field is 3 symbols long, the GP field is 10 symbols long and the UpPTS field is 1 symbol long.

In TDD-LTE wireless systems, an additional fourth preamble for the random access channel, called short RACH, may be used. If short RACH signaling is to be used, the random access preamble is transmitted in the uplink pilot time slot (UpPTS) field in the special subframe. The uplink pilot time slot is up to two OFDM symbols long. Because the UpPTS only occupies two OFDM symbols, the preamble and guard time of the short RACH is shortened. Therefore, the preamble and guard time of short RACH are substantially shorter than normal RACH preamble formats. In order to transmit short RACH, special subframe configurations 5-8 are used, as these configurations include an uplink pilot time slot (UpPTS) that is two symbols long.

The location of the uplink pilot time slot (UpPTS) is next to a downlink subframe. Therefore, interference from neighbor base stations may interfere with the short RACH preamble within the uplink pilot time slot. If the short RACH preamble is affected by interference and the downlink signal of an impacted cell is very good. The UE will stay on the impacted cell while continuing to make multiple random access attempts with increasing transmit power. The interference to the short RACH will prevent the eNodeB from detecting the short RACH preamble and thus prevent the UE from accessing the network.

Figure 6:
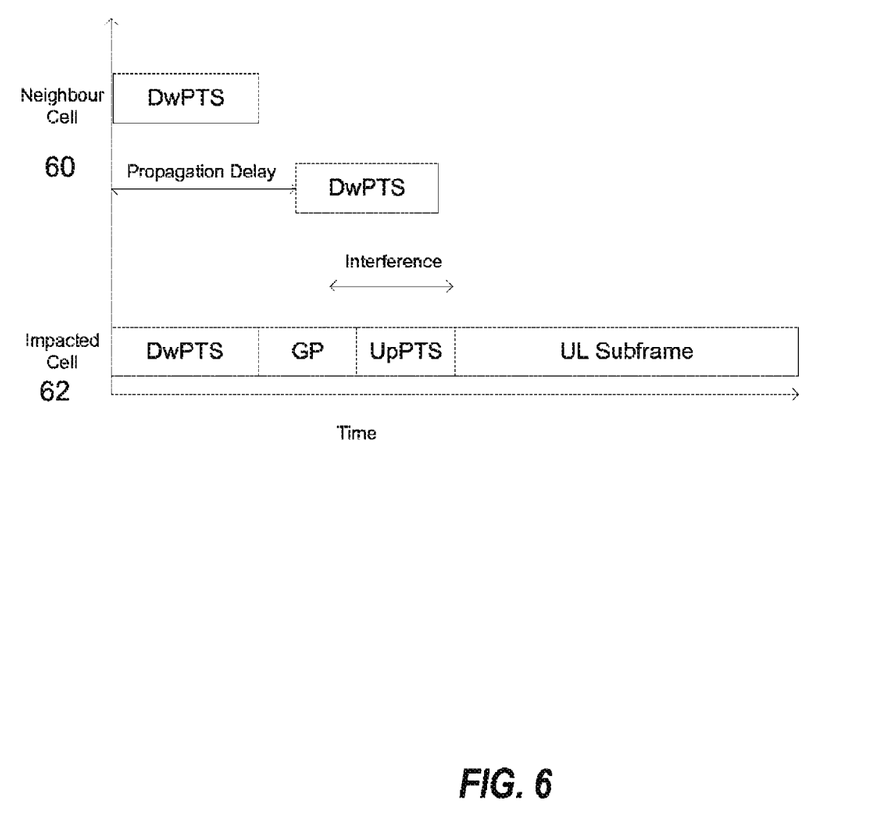
FIG. 6 is a diagram conceptually illustrating an interference situation.

An example of such interference is shown in FIG. 6. As seen in FIG. 6, a neighbor cell 60 may transmit its downlink pilot time slot (DwPTS) at the same time as the impacted cell 60. Because of a propagation delay, caused by distance or any other reason, the downlink pilot time slot (DwPTS) of the neighbor cell 60 is received by the impacted cell 62 during the gap (GP) and/or uplink pilot time slot (UpPTS) portions of the impacted cell's special subframe. This overlap may cause interference for the impacted cell, in turn causing the issues described above.

When performance of a cell is impacted by interference, such as in the exemplary situation shown in FIG. 6, short RACH signaling may be disabled to improve performance. In some configurations, short RACH resources can be reallocated. For example, symbols originally dedicated to the short RACH preamble in the UpPTS can be reallocated to gap (GP) or DwPTS fields by changing the special subframe configuration to a configuration other than configurations 5-8. In other configurations, short RACH signaling can be disabled without changing special subframe configurations. In yet other configurations, when the short RACH signaling is disabled, normal RACH signaling can be enabled to continue RACH transmissions. In some other configurations, the special subframe configuration may be changed to a configuration with a larger gap (GP) duration to attempt to avoid the interference.

Figure 7:
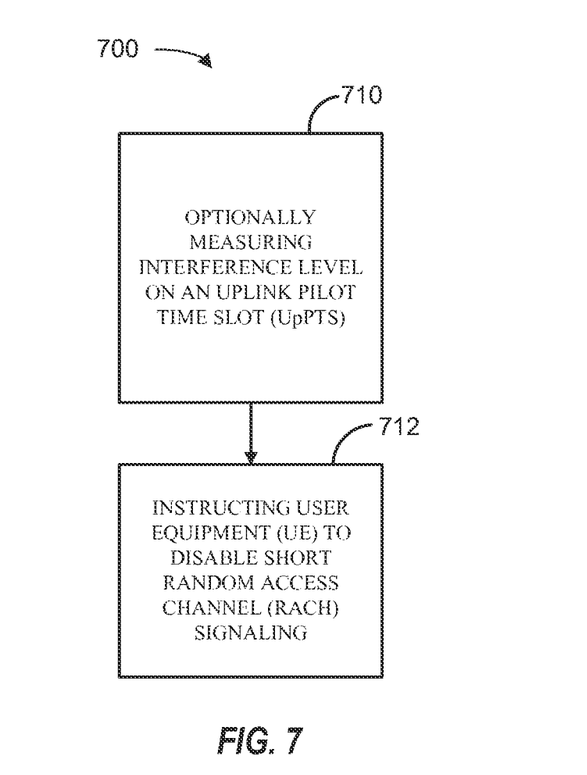
FIG. 7 is a block diagram illustrating a method for disabling short RACH according to an aspect of the present disclosure.

FIG. 7 illustrates a method 700 for disabling short RACH signaling. In block 710, an eNodeB optionally measures the interference level of an UpPTS. Next, in block 712, the eNodeB instructs the UE to disable short RACH signaling when the measured interference exceeds a predefined threshold. Instructions to disable short RACH signaling may be performed with a broadcast instruction when the UE is in idle mode or a dedicated message when the UE is in connected mode. For example, short RACH signaling may be disabled in response to a Radio Resource Control (RRC) message or a short RACH flag. A short RACH flag can be a bit inserted in the dedicated traffic data to the UE. The bit is designated for enabling or disabling the short RACH feature. In configurations where an RRC message is used, the RRC message may provide a special subframe configuration change.

Figure 8:
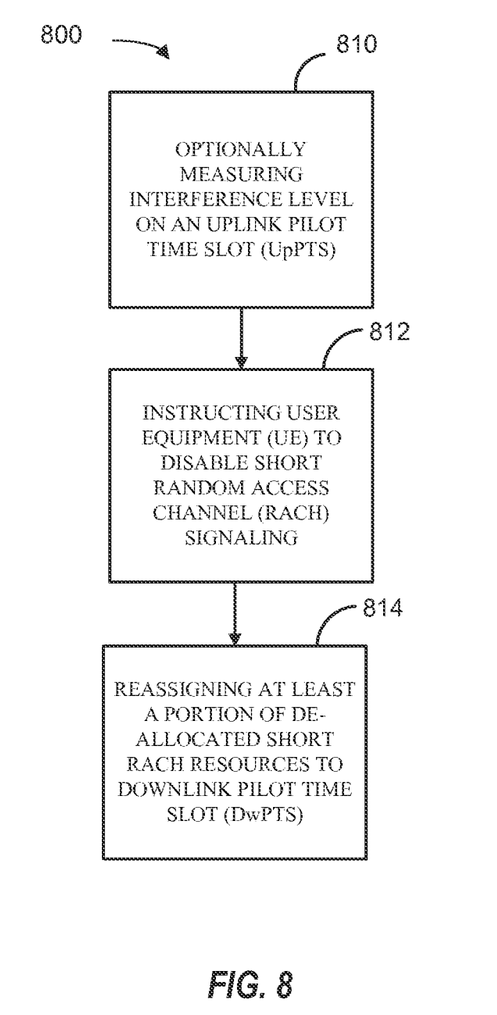
FIG. 8 is a block diagram illustrating another method for disabling short RACH according to an aspect of the present disclosure.

FIG. 8 illustrates method 800 for disabling short RACH signaling. In block 810, an eNodeB optionally measures the interference level on a UpPTS. Next, in block 812, the eNodeB instructs the UE to disable short RACH signaling, for example when the interference level exceeds a threshold value. In block 814, the eNodeB reassigns at least a portion of de-allocated short RACH resources to the DwPTS. This reassignment may be accomplished by changing special subframe configurations to a configuration that provides fewer UpPTS symbols and more DwPTS symbols for each subframe.

Figure 9:
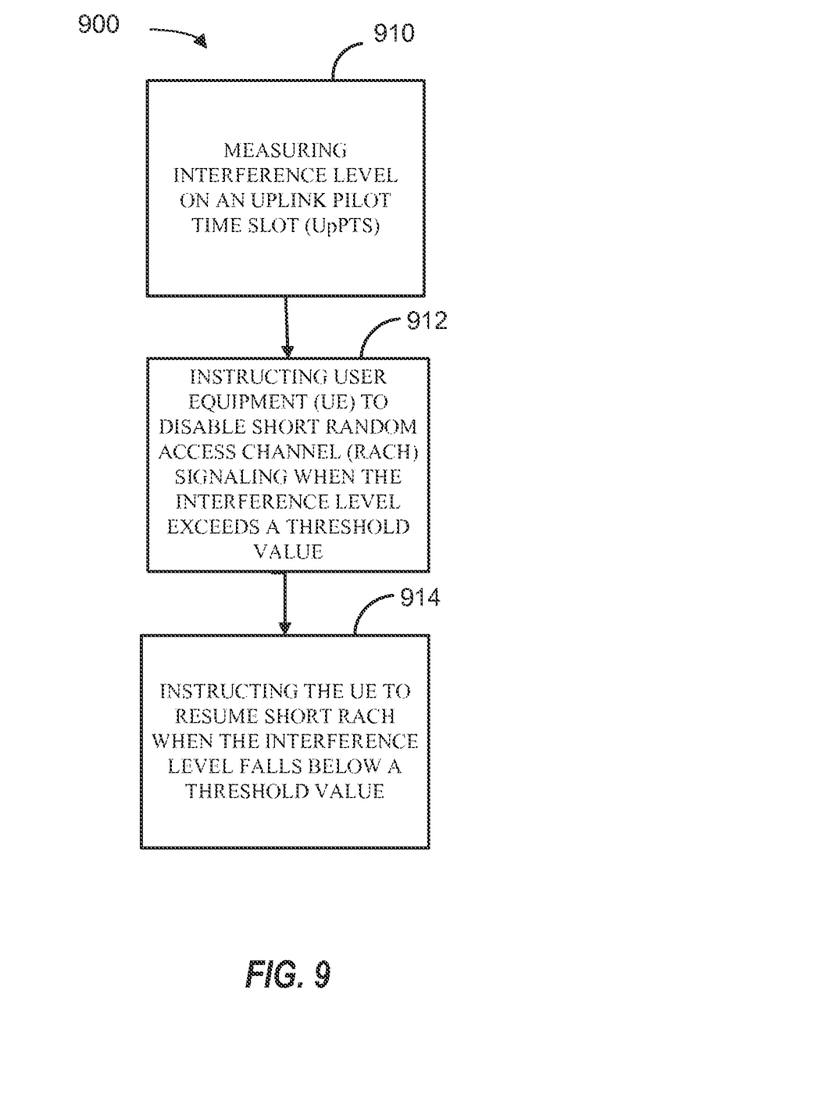
FIG. 9 is a block diagram illustrating another method for disabling short RACH related to interference levels, according to an aspect of the present disclosure.

FIG. 9 illustrates another method 900 for disabling short RACH signaling. In block 910, an eNodeB measures the interference level on an UpPTS. Next, in block 912, the eNodeB instructs the UE to disable short RACH signaling when the interference level exceeds a specified threshold value. In block 914, the eNodeB may instruct the UE to resume short RACH signaling when the interference level falls below a specified threshold.

Figure 10:
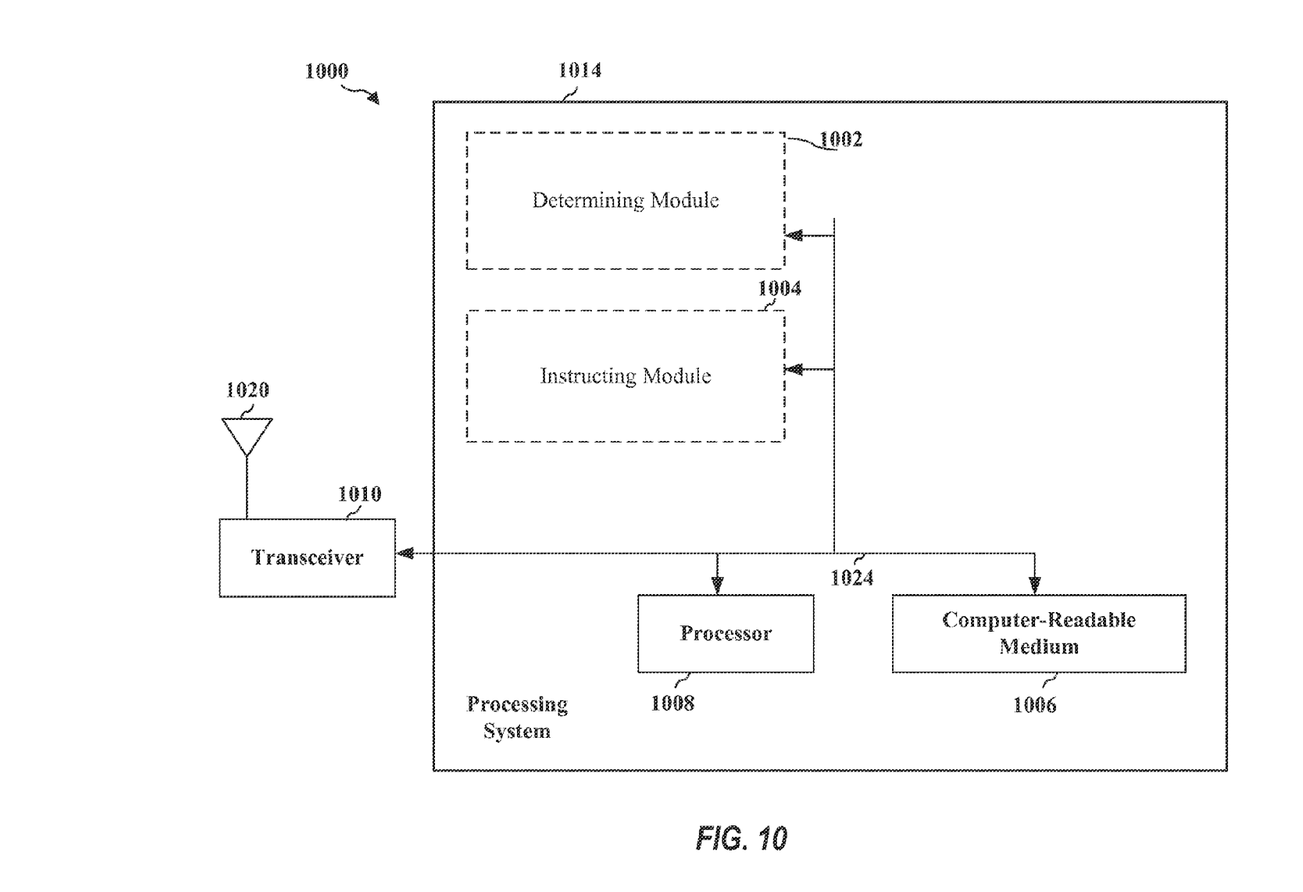
FIG. 10 is a diagram illustrating an example of a hardware implementation for an apparatus employing a processing system.

FIG. 10 is a diagram illustrating an example of a hardware implementation for an apparatus 1000 employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1008, the modules 1002, 1004, and the computer-readable medium 1006. The bus 1024 may also link various other circuits such as timing sources, peripherals, voltage regulators, and power management circuits, which are well known in the art, and therefore, will not be described any further.

The apparatus includes a processing system 1014 coupled to a transceiver 1010. The transceiver 1010 is coupled to one or more antennas 1020. The transceiver 1010 enables communicating with various other apparatus over a transmission medium. The processing system 1014 includes a processor 1008 coupled to a computer-readable medium 1006. The processor 1008 is responsible for general processing, including the execution of software stored on the computer-readable medium 1006. The software, when executed by the processor 1008, causes the processing system 1014 to perform the various functions described for any particular apparatus. The computer-readable medium 1006 may also be used for storing data that is manipulated by the processor 1008 when executing software.

The processing system includes a determining module 1002 and an instructing module 1004. The determining module can determine whether short Random Access Channel (RACH) signaling should be disabled by the UE. For example, the determination can be based on an interference analysis. The instructing module can instruct the UE to disable short RACH signaling when it is determined to be appropriate. The modules may be software modules running in the processor 1008, resident/stored in the computer readable medium 1006, one or more hardware modules coupled to the processor 1008, or some combination thereof. The processing system 1014 may be a component of the eNB 110 and may include the memory 242, the transmit processor 220, the receive processor 238, the modulators/demodulators 232a-t, the antenna 234a-t, and/or the controller/processor 240.

In one aspect, the eNodeB 110 is configured for wireless communication including means for determining and means for instructing. In one aspect, the determining means may be the receive processor 238, demodulator 232a, antenna 234a, memory 242 and/or controller processor 240 configured to perform the functions recited by the determining means. In one aspect, the instructing means may be the memory 242, controller processor 240, transmit processor 220, modulators 232a-t and/or antenna 234a-t configured to perform the functions recited by the instructing means. In another aspect, the aforementioned means may be a module or any apparatus configured to perform the functions recited by the aforementioned means.

Figure 11:
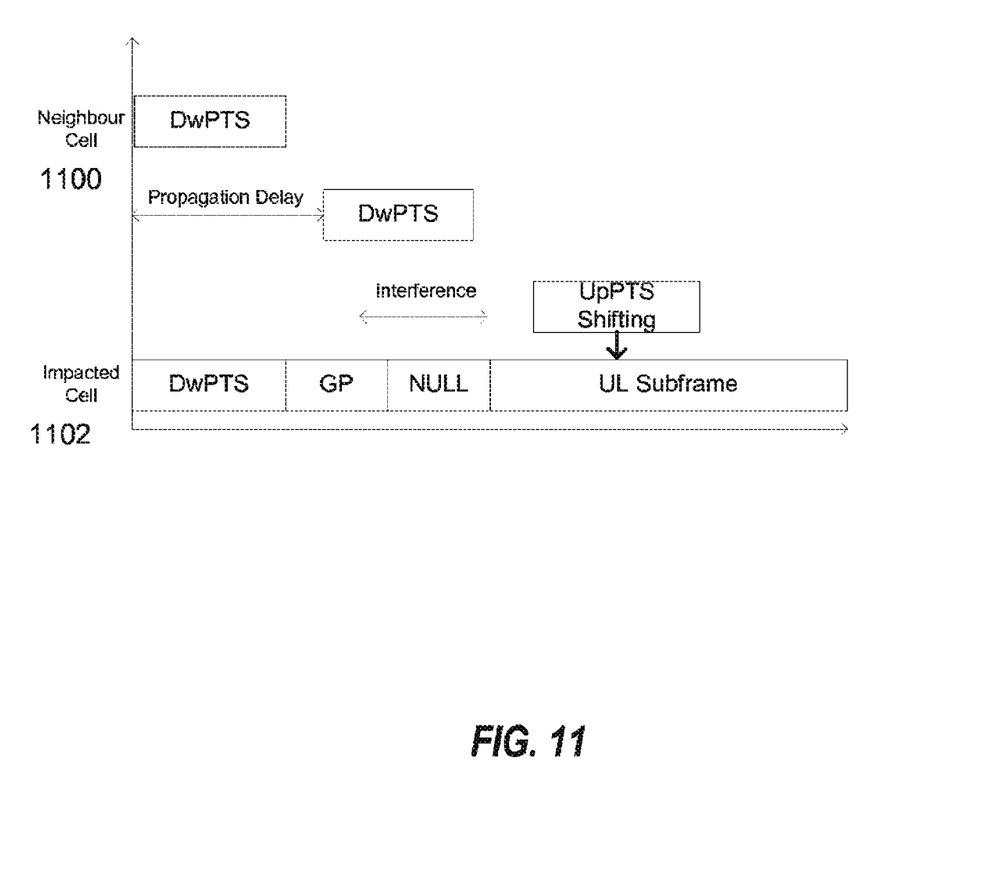
FIG. 11 is a diagram conceptually illustrating another interference situation.

As an alternative to disabling short RACH signaling, the short RACH preamble can be shifted as shown in FIG. 11. As seen in FIG. 11, a neighbor cell 1100 may transmit its downlink pilot time slot (DwPTS) at the same time as the impacted cell 1102. Because of a propagation delay, caused by distance or any other reason, the downlink pilot time slot (DwPTS) of the neighbor cell 1100 is received by the impacted cell 1102 during the gap (GP) and/or uplink pilot time slot (UpPTS) portions of the impacted cell's special subframe. This overlap may cause interference for the impacted cell, in turn causing the issues described above. If the inference level is above the predefined threshold, the short RACH preamble can be shifted to the following uplink sub-frame. This change can be signaled as described in reference to disabling short RACH signaling. In case that inference level returns to below the predefined threshold, short RACH signaling can move back to the uplink pilot time slot from the normal uplink (UL) sub-frame.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
measuring an interference level on an Uplink Pilot Time Slot (UpPTS) to determine whether a short Random Access Channel (RACH) signaling should be disabled by a User Equipment (UE); and
instructing a User Equipment (UE) using an indicator for short RACH communication to disable short Random Access Channel (RACH) signaling for communicating a short RACH in response to the measurement.

2. The method of claim 1, further comprising instructing the UE to disable the short RACH signaling when the interference level exceeds a threshold value.

3. The method of claim 2, further comprising instructing the UE to resume short RACH signaling when the interference level falls below the threshold value.

4. The method of claim 1, further comprising reassigning at least a portion of de-allocated short RACH resources to a Downlink Pilot Time Slot (DwPTS).

5. The method of claim 1, in which the instructing changes a special sub frame configuration.

6. The method of claim 1, in which the indicator for the short RACH communication comprises a short RACH flag.

7. The method of claim 1 further comprising enabling normal RACH.

8. The method of claim 1, in which the instructing comprises transmitting a broadcast message including the indicator for the short RACH communication.

9. The method of claim 1, in which the instructing comprises transmitting a dedicated message including the indicator for the short RACH communication.

10. An apparatus for wireless communication, comprising:
   means for measuring an interference level on an Uplink Pilot Time Slot (UpPTS) to determine whether short Random Access Channel (RACH) signaling should be disabled by a User Equipment (UE); and
   means for instructing the UE to disable short RACH signaling for communicating a short RACH in response to the measuring.

11. The apparatus of claim 10, in which the instructing means further comprises means for instructing the UE to disable the short RACH signaling when the interference level exceeds a threshold value.

12. The apparatus of claim 11, further comprising means for instructing the UE to resume short RACH signaling when the interference level falls below the threshold value.

13. The apparatus of claim 10, further comprising means for reassigning at least a portion of de-allocated short RACH resources to a Downlink Pilot Time Slot (DwPTS).

14. The apparatus of claim 10, in which the instructing means changes a special sub frame configuration.

15. The apparatus of claim 10, in which the instructing means controls a short RACH flag.

16. The apparatus of claim 10 further comprising means for enabling normal RACH signaling.

17. The apparatus of claim 10, in which the instructing means comprises means for transmitting a broadcast message.

18. The apparatus of claim 10, in which the instructing means comprises means for transmitting a dedicated message.

19. A computer program product for wireless communication in a wireless network, comprising:
   a non-transitory computer-readable medium having non-transitory program code recorded thereon, the program code comprising:
      program code to measure an interference level on an Uplink Pilot Time Slot (UpPTS) to determine whether short Random Access Channel (RACH) signaling should be disabled by a User Equipment (UE); and
      program code to instruct the UE using an indicator for short RACH communication to disable short RACH signaling for communicating a short RACH in response to the measuring.

20. An apparatus for wireless communication, comprising:
   a memory; and
   at least one processor coupled to the memory, the at least one processor being configured:
      to measure an interference level on an Uplink Pilot Time Slot (UpPTS) to determine whether short Random Access Channel (RACH) signaling should be disabled by a User Equipment (UE); and
      to instruct the UE using an indicator for short RACH communication to disable short RACH signaling for communicating a short RACH in response to the measuring.

21. The apparatus of claim 20, in which the at least one processor is further configured:
   to instruct the UE to disable short RACH signaling when the interference level exceeds a threshold value.

22. The apparatus of claim 21, in which the at least one processor is further configured to instruct the UE to resume short RACH signaling when the interference level falls below the threshold value.

23. The apparatus of claim 20, in which the at least one processor is further configured to reassign at least a portion of de-allocated short RACH resources to a Downlink Pilot Time Slot (DwPTS).

24. The apparatus of claim 20, in which the at least one processor is configured to instruct the UE by changing a special sub frame configuration.

25. The apparatus of claim 20, in which the at least one processor configured to instruct the UE using the indicator for short RACH communication, in which the indicator for short RACH communication includes a short RACH flag.

26. The apparatus of claim 20, in which the at least one processor is further configured to enable normal RACH signaling.

27. The apparatus of claim 20, in which the at least one processor is configured to instruct the UE by transmitting a broadcast message including the indicator for the short RACH communication.

28. The apparatus of claim 20, in which the at least one processor is configured to instruct the UE by transmitting a dedicated message including the indicator for the short RACH communication.

* * * * *